United States Patent [19]

Parsons

[11] 4,062,251

[45] Dec. 13, 1977

[54] MOTION TRANSMITTING REMOTE CONTROL ASSEMBLY

[75] Inventor: William H. Parsons, Lansdale, Pa.

[73] Assignee: Teleflex Incorporated, North Wales, Pa.

[21] Appl. No.: 670,749

[22] Filed: Mar. 26, 1976

[51] Int. Cl.$^2$ .......................... F16C 1/10; F16C 31/00
[52] U.S. Cl. .................... 74/501 R; 308/3.8; 308/6 R; 29/148.4 C
[58] Field of Search ................. 74/501 R, 501 P, 502; 29/148.4 A, 148.4 B, 148.4 C, 442; 308/3.8, 6 R

[56] References Cited

U.S. PATENT DOCUMENTS

| | | | |
|---|---|---|---|
| 848,776 | 4/1907 | Sisson | 29/148.4 A |
| 962,502 | 6/1910 | Elmborg | 29/148.4 A |
| 1,073,180 | 9/1913 | Stolz | 308/6 R X |
| 1,584,839 | 5/1926 | Cameron | 29/148.4 A |
| 1,629,173 | 5/1927 | Parsons | 29/148.4 C |
| 1,733,673 | 10/1929 | Rouanet | 29/148.4 C |
| 2,704,695 | 3/1955 | Ricefield | 29/148.4 A X |
| 2,724,625 | 11/1955 | White | 29/148.4 A |
| 2,751,664 | 6/1956 | Arnit | 74/501 R |
| 2,812,222 | 11/1957 | Gussack | 308/6 R |
| 2,845,813 | 8/1958 | Richoux | 74/501 R |
| 2,967,741 | 1/1961 | Bostelmann | 308/6 R |
| 3,217,557 | 11/1965 | Martinot | 74/501 P |
| 3,256,051 | 6/1966 | Howe | 29/148.4 A |
| 3,362,249 | 1/1968 | Richoux | 74/501 P |
| 3,509,782 | 5/1970 | Molnar | 74/501 R |
| 3,631,731 | 1/1972 | Hawtree et al. | 74/501 R |
| 3,667,313 | 6/1972 | Young, Jr. | 74/501 P |

FOREIGN PATENT DOCUMENTS

| | | | |
|---|---|---|---|
| 62,442 | 6/1955 | France | 308/6 R |

Primary Examiner—Samuel Scott
Assistant Examiner—Don E. Ferrell
Attorney, Agent, or Firm—McGlynn and Milton

[57] ABSTRACT

A ball cage retainer of the type including a pair of coextensive strips having annular pocket portions defined by truncated angular flanges to define ball retaining pockets for rotatably retaining balls between the strips with the strips spot welded together and a method and apparatus for assembling such a ball cage. The ball cage is utilized in a conduit of a motion transmitting remote control assembly for facilitating the movement of a motion transmitting core element within the conduit. The cage is assembled by indexing a pair of metal ribbon-like strips successively through a plurality of stations by two sets of fixed and movable clamping assemblies. The pocket portions, and alignment notches adjacent the pocket portions, are simultaneously formed in each of the strips at a first station as the strips pass through the first station in parallel relationship to one another. One of the strips passes through a second station and balls are placed in each of the pocket portions of that strip. Thereafter the two strips are guided into coextensive abutting relationship with the coacting pocket portions defining the ball retaining pockets surrounding the balls. With the strips in abutting relationship with one another they pass through a third station where an aligning member engages the alignment notches in the two strips for longitudinally aligning the strips along the length of the strips having the ball retaining pocket therein adjacent which the strips are to be secured together by a welder which engages the strips for spot welding the strips together while the strips are maintained aligned with one another by the aligning member.

8 Claims, 3 Drawing Figures

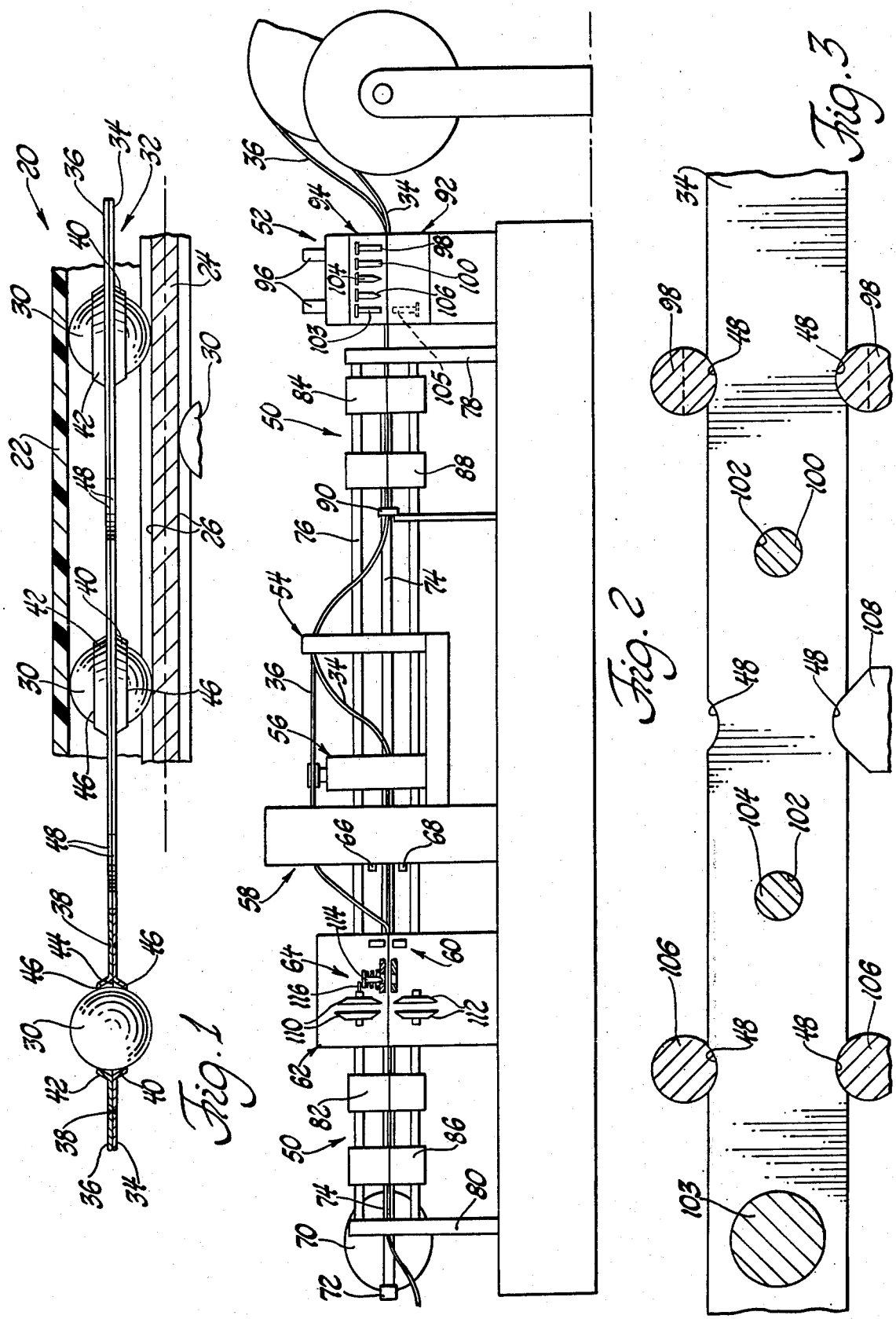

4,062,251

MOTION TRANSMITTING REMOTE CONTROL ASSEMBLY

This invention relates to a motion transmitting remote control assembly of the type for transmitting motion in a curved path by a flexible motion transmitting core element disposed within a conduit for longitudinal movement within the conduit and with a plurality of roller elements disposed within the conduit and engaging the core element for facilitating longitudinal movement of the core element relative to the conduit and, more specifically, to a retainer cage means interconnecting a plurality of the roller elements and including first and second coextensive and abutting ribbon-like strips secured together and defining pocket portions in each strip which coact to define a retaining pocket between the strips for each of the roller elements to rotatably retain one of the roller elements in each of the pockets. This invention relates to the cage retainer comprising the two strips as well as to a method and apparatus for assembling such a cage retainer.

Such cage retainers are assembled by forming pocket portions in ribbon-like metal strips whereby when the strips are placed in abutting relationship with one another, the pocket portions coact to define retaining pockets for the roller elements. Usually each of the strips are continuous or of very long lengths which, after being secured together, are severed into the desired lengths for particular remote control assemblies. Even though the pocket portions in the respective strips are formed at equal distances along the respective strips and the pocket portions are initially aligned with one another at the lead ends of the strips, the pocket portions in the two strips will become longitudinally misaligned further along the strips because of a stack-up of tolerances which, in turn, causes friction loads on the roller elements because the retaining pockets are not properly defined to allow free uninhibited rotation of the roller elements.

The subject invention solves this problem by providing a cage retainer and a method and apparatus for assembling same wherein the cage retainer includes first and second coextensive abutting ribbon-like strips secured together and defining pocket portions in each strip which coact to define a retaining pocket between the strips to rotatably retain one of the roller elements in each of the pockets with each of the strips including alignment means formed therein at longitudinally spaced positions along the strips whereby, as the two ribbon-like strips are assembled and secured together at spaced positions therealong and adjacent each of the retaining pockets, they are longitudinally aligned with one another along the lengths thereof having the ball retaining pocket adjacent which the strips are secured together prior to and during the securing of the strips together by an aligning member engaging the alignment means of the two strips.

Other advantages of the present invention will be readily appreciated as the same becomes better understood by reference to the following detailed description when considered in connection with the accompanying drawings wherein:

FIG. 1 is an enlarged fragmentary cross-sectional view of a motion transmitting remote control assembly including a cage retainer assembled in accordance with the subject invention;

FIG. 2 is a schematic elevational view of an apparatus for assembling the cage retainer shown in FIG. 1;

FIG. 3 is an enlarged plan view of one of the strips forming the cage retainer in the forming means and showing various components of the forming means in cross section.

A motion transmitting remote control assembly of the type for transmitting motion in a curved path by a flexible motion transmitting core element is generally shown at 20 in FIG. 1. The remote control assembly 20 includes a conduit 22 with a motion transmittng core element 24 disposed centrally within the conduit 22 for longitudinal movement relative to the conduit 22. The conduit 22 may be any one of various well known types such as wire reinforced plastic, braided wire, or the like. The core element 24 is the well known type comprising a flat metal strip with grooves 26 on the opposite faces thereof and extending longitudinally along the core element. A plurality of roller elements or balls 30 are disposed within the conduit 22 and engage the grooves 26 in the core element 24 for facilitating longitudinal movement of the core element 24 relative to the conduit 22. It will be appreciated that approximately only one-half of the assembly is illustrated and that races defined by longitudinal strips having grooves therein may be disposed between the balls 30 and the conduit 22 so that the balls roll along the races instead of being in rolling engagement with the conduit 22.

A cage retainer means generally indicated at 32 interconnects a plurality of the balls 30 on each side of the core element 24. In other words, although not shown, a cage retainer means 32 extends along the conduit between each side of the core element 24 and the conduit 22. Each retainer cage means 32 includes first and second coextensive and abutting ribbon-like metal strips 34 and 36. The strips 34 and 36 are secured together by spot welds 38 spaced longitudinally along the strips and disposed centrally thereof. The strips 34 and 36 each have pocket portions 40 and 42 respectively which coact together to define ball retaining pockets between the strips for each of the balls 30 whereby one of the balls 30 is rotatably retained in each of the retaining pockets. The pocket portions 40 and 42 are defined by a circular opening 44 and inwardly angled truncated conical flanges surrounding the openings 44 in each of the strips and aligned with one another so that the two openings 44 are aligned, as are the flanges of the opposing strips to define the ball retaining pockets. Each of the openings 44 has a diameter which is slightly larger than the diameter of the balls 30 and the flanges define outwardly disposed openings 46 having a diameter smaller than that of the balls 30.

The cage retainer means 32 also includes alignment means defined by the notches 48 formed in the strips 34 and 36 at longitudinally spaced positions along the strips. More specifically, each notch 48 is disposed in a fixed predetermined relationship to an adjacent ball retainer pocket. Each notch 48 is in the same position along the strips relative to a ball retaining pocket as every other notch is disposed relative to another ball retaining pocket. There are notches 48 along opposite edges of the strips 34 and 36 and in the fixed predetermined relationship to each and every ball retaining pocket. Each notch 48 is aligned and coextensive with a like notch in the opposing strip. Additionally, two aligned and coextensive notches 48 in the respective strips 34 and 36 are transversely aligned across the strips with a like pair of notches on the opposite edge of the strips and the notches are spaced longitudinally along the strips 34 and 36 midway between juxtaposed or next adjacent ball retaining pockets.

FIG. 2 is a side elevational view in schematic form showing an apparatus for assembling the ball cage 32 defined by the coextensive metal strips 34 and 36 having pocket portions 40 and 42 therein for defining ball retaining pockets for rotatably retaining the balls 30 between the strips.

The apparatus includes indexing means generally shown at 50 for simultaneously indexing the pair of strips 34 and 36 successively through a plurality of stations in successive incremental lengths of movement equal to the distance between the centers of the longitudinally spaced ball retaining pockets, as will be apparent hereinafter. The incremental lengths of movement of the strips 34 and 36 may be distances equal to successive or next adjacent ball retaining pockets or may be any multiple thereof, depending upon the configuration of the other components in the apparatus.

The apparatus also includes a forming means generally shown at 52 for simultaneously forming the pocket portions 40 and 42 and the notches 48 defining the alignment means adjacent the pocket portions 40 and 42 in each of the strips 34 and 36 at a first station in the apparatus. The strips 34 and 36 are unwound from separate coils of metal strips and are fed into the forming means 52 in laterally spaced and parallel relationship to one another. The apparatus includes a guide post generally indicated at 54 for maintaining the strips 34 and 36 in laterally spaced and parallel relationship to one another and a subsequent guide assembly, generally indicated at 56, for maintaining the strips 34 and 36 vertically spaced from one another.

The apparatus also includes a ball loading means generally shown at 58 through which the first or lower strip 34 and the second or upper strip 36 passes through for placing balls 30 in the pocket portions 40 of the first strip 34, the ball loading means being at a second station. The ball loading means 58 may take one of various different configurations. For example, the ball loading means 58 may be of the type disclosed in U.S. Pat. No. 3,831,249 granted Aug. 27, 1974 in the names of Sheldon E. Perlman and John C. Ion and assigned to the assignee of the subject application.

The assembly also includes guide means generally shown at 60 for guiding the strips 34 and 36 into coextensive abutting relationship with the coacting pocket portions 40 and 42 defining the ball retaining pocket surrounding the balls 30. In other words, the guide means 60 guides the upper strip 36 into coextensive overlapping relationship with the lower strip 34 whereby the strip 36 is immediately above the strip 34. The guide means 60 guides the strips 34 and 36 subsequent to the first or lower strip 34 moving away from the ball loading means 58.

The apparatus also includes a securing means positioned at a third station and generally shown at 62 for successively securing the strips together adjacent each ball retaining pocket therein.

Also included at the third station is positioning means generally shown at 64 for successively longitudinally aligning the strips 34 and 36 along the length thereof having the ball retaining pocket adjacent which the strips are secured together prior to and during the securing of the strips 34 and 36 together by the securing means 62.

Also included is a sensing means comprising a light source 66 and a photocell 68 for sensing the absence of a ball in each pocket portion 40 of the first or lower strips 34 after the strip 34 moves away from the ball loading means 58.

Although not totally or specifically illustrated, appropriate control means including micro switches, cams, etc., are included for controlling and sequencing the indexing means 50, the forming means 52, the securing means 62, and the positioning means 64 for indexing the movement of the strips 34 and 36 through the stations in successive incremental lengths of movement between stopped positions of the strips 34 and 36, which lengths are equal to the distance between the centers of longitudinally spaced pocket portions 40 and 42, and for actuating the forming means 52, the securing means 62 and the positioning means 64 while the strips 34 and 36 are in the stopped positions between the incremental lengths of movement. Included in the indexing means 50 is an eliptical cam 70 which engages a cam follower 72 for longitudinally moving a movable rod 74. The cam 70 is eliptical thereby oscillating the movable rod 74 back and forth during rotating movement of the cam 70. The indexing means 50 also includes the stationary rods 76 fixed to and supported by posts 78 and 80, the movable rod being slidably supported by posts including post 80.

The movable rod 74 and stationary or fixed rods 76 extend longitudinally along the apparatus in parallel spaced relationship to one another. The indexing means 50 includes first and second movable clamping means defined by the clamping units 82 and 84 which are rigidly fixed to the movable rod 74 for selectively clamping the strips 34 and 36. The clamping units 82 and 84 comprise upper and lower clamps spring biased together into engagement with the strips and are solenoid or air actuated. The clamping unit 84 has two parallel paths extending therethrough for clamping the strips 34 and 36 in laterally spaced parallel relationship. The clamping unit 82, however, has one clamping passage extending therethrough as the strips 34 and 36 are in coextensive overlapping and abutting relationship with one another as they pass therethrough. Also included in the indexing means are first and second stationary clamping means defined by the clamping units 86 and 88 which are fixed in a stationary manner to the stationary rods 76 for selectively clamping the strips 34 and 36. The clamping unit 88 has two parallel passages for clamping the strips in laterally spaced parallel relationship whereas the clamping unit 86 has a single passage therethrough for clamping the strips when they are disposed together. The movable clamping unit 84 and the fixed clamping unit 88 are positioned between the forming means 52, which is at the first station, and the ball loading means 58, which is at the second station. The movable clamping unit 82 and the fixed stationary clamping unit 86 are positioned downstream of the securing means 62 which is at the third station. After the strips leave the clamping unit 86 they may be coiled upon a storage coil not shown.

The control means (not shown) includes a sequencing means including micro switches etc., for actuating the movable clamping units 82 and 84 to clamp the strips 34 and 36 during the incremental movement of the strips between stopped positions and for actuating the stationary clamping units 86 and 88 to clamp the strips 34 and 36 in each stopped position of the strips. The control means also controls rotation of the cam 70 which defines an oscillating means for longitudinally oscillating the movable rod 74 for incrementally moving the strips 34 and 36 between the stopped positions.

There is also included a guide 90 downstream of the fixed clamping unit 88 for maintaining the strips 34 and 36 in laterally spaced parallel relationship to one another.

The forming means 52 comprises lower and upper die components or sets generally indicated at 92 and 94 respectively. The die sets 92 and 94 are movable vertically relative to one another by actuators 96 which may be pneumatic or hydraulic and sequenced by the control means. The die sets 92 and 94 include first and second laterally spaced and parallel guide passages for guiding the first strip 34 through the first guide passage and the second strip 36 through the second guide passage. The forming means includes severing means comprising a pair of notching punches 98 disposed on each side or along each edge of each of the guide passages extending through the die sets for severing away a piece of each strip for making the notches 48 in each side or edge of each strip while the strips are in each stopped position. FIG. 3 shows the strip 34 in a stopped position with the notching punches 98 shown in cross section in the position where the punches 98 have severed pieces from the strip 34 to define the notches 48.

The forming means 52 also includes piercing means comprising the piercing punches 100, one of which is disposed over or transversely to each guide passage and, consequently, each strip 34 and 36, for piercing or forming holes 102 through the strips 34 and 36 in each stopped position to define the position of the pocket portions 40 and 42 in the strips 34 and 36. The notching punches 98 and the piercing punches 100 are supported by the upper die set 94 and, as the upper and lower die sets 92 and 94 come together, the punches 98 and 100 are moved downwardly to engage and notch and pierce the respective strips. The punches 98 and 100 move downwardly so that they engage the strips simultaneously while the strips are in a stopped position whereby the notches 48 are formed simultaneously with the holes 102 to precisely position the holes 102 relative to the notches 48, and vice versa.

The forming means also include extruding means comprising the extruding punches 103 and 105 disposed to extend transversely to the respective guide passages for extruding the truncated conical flanges at each of the holes 102 for defining the pocket portions 40 and 42 respectively. The extruding punch 103 is attached to the upper die set 94 and moves downwardly to form the pocket portions 40 in the lower strip 34 whereas the extruding punch 105 is attached to the lower die set 92 and moves upwardly to form the pocket portions 42 in the upper strip 36. In other words, the extruding punches 103 and 105 extrude the strips 34 and 36 about each of the holes 102 formed therein while the strips are in a stopped position but subsequent to a stopped position in which the holes 102 and the notches 48 are formed in the strips. The actuators 96 define actuation means for simultaneously actuating the forming means defined by the punches 98, 100 and 103.

The forming means also includes pilot means for engaging the holes 102 in the strips at a position between the piercing punch 100 and the extruding punch 102 and also for engaging the notches 48 to position the strips in each stopped position in the forming means 52. More specifically, the pilot means comprises a plurality of tapered pilot pins 104 and 106 with the pilot pins 104 engaging the holes 102 and the pilot pins 106 engaging the notches 48.

As shown in FIG. 3, there is also included a biasing means comprising a detent locator 108 for engaging the notches 48 and for urging the strips laterally in the same direction against the respective lateral extremities of the guide passages extending therethrough. In other words, the detent locator 108 is biased in a direction against the strip 34 as shown in FIG. 3 to urge the strip 34 against the edge of the guide passageway extending through the die sets 92 and 94.

The securing means 62 includes spot welders defined by an upper pair of welding wheels 110 and a lower pair of welding wheels 112 for engaging the abutting strips 34 and 36 at the third station for spot welding the strips together as shown at 38 in each stopped position of the strips 34 and 36. The upper pair of welding wheels 110 are spaced from one another longitudinally of the strips above the strips 34 and 36 and in a similar fashion the lower pair of welding wheels 112 are spaced from one another longitudinally of the strips but below the strips 34 and 36. The control means includes means for moving the welding wheels 110 and 112 vertically into engagement with the strips 34 and 36.

The positioning means 64 includes a pair of tapered members 114 on each side or along each edge of the abutting strips 34 and 36 at the third station for engaging and aligning the notches 48 on opposite sides of the strips in each stopped position of the strips 34 and 36. The tapered members or pins 114 are spring biased upwardly and have a top engaged by a portion 116 attached to the support for one of the upper welding wheels 110 whereby, when the upper welding wheels 110 are moved downwardly to engage the strips, the pins 114 are moved downwardly to engage the notches 48 on each side of the strips so that the length of the strips adjacent the notches are aligned to align the pocket portions 40 and 42 of the pocket adjacent which the strips are welded together. The welding wheels 110 and 112 are spaced apart so as to engage the strips on opposite sides of each of the retaining pockets to spot weld the strips together at 38 on each side of each retaining pocket defined by the pocket portions 40 and 42.

To summarize the overall operation, a pair of ribbon-like metal strips 34 and 36 pass in parallel relationship through the forming means 52 and when the strips 34 and 36 are in a stopped position the die sets 92 and 94 are moved together whereby the notches 48 defining the alignment means and the holes 102 for positioning the pocket portions 40 and 42 are simultaneously formed by the notching punches 98 and the piercing punches 100. The apparatus is then sequenced by the control means whereby the movable clamping units 82 and 84 clamp the strips and move the strips an incremental distance which is equal to the distance between adjacent holes 102 or adjacent retaining pockets as defined by the pocket portions 40 and 42. Once the strips have been moved the incremental distance, the stationary clamping units 86 and 88 clamp the strips and the movable clamping units 82 and 84 release the strips and are moved back to the right upon rotation of the cam 70. The detent locator 108 urges the strip laterally against the side of the guide passage and the upper and lower die sets 92 and 94 are again actuated and the pilot pins 104 and 106 engage the hole 102 and the notches 48 to position the strips accurately as the next adjacent hole 102 and notches 48 are formed. The indexing means 50 is then again sequenced to move the strips forward incrementally and the same operation occurs with the extruding punches 102 and 105 engaging the strips at the holes 102 for extruding the pocket portions 40 and 42 therein. The strips are thus successively moved incremental distances between stopped positions and extend through the guides 90 and 94 in parallel spaced relationship to one another. The guide 56 separates the strips vertically whereby the lower strip 34 passes through the ball loading means 58 to have balls placed in the pocket portions 40 thereof. As the lower strip 34 leaves the ball loading means 58, the sensing means comprising the light source 66 and photocell 68 determine the absence of a ball in the pocket portions 40 of the lower strip 34. The strips 34 and 36 then pass through another guide 60 which disposes the strips in abutting, overlapping and coextensive relationship with one another. During each actuation of the die sets 92 and 94, the welding wheels 110 and 112 are moved toward one another whereby the tapered pins 114 engage the notches 48 in the strips to perfectly align and make coextensive the notches 48 on the opposite sides of the strips 34 and 36 thereby longitudinally aligning the lengths of the strips between the welding wheels 110 and 112 whereby the pocket portions 40 and 42 are perfectly aligned and are welded in position as the welding wheels 110 and 112 engage the strips. Thus, the strips are successively secured together adjacent or on opposite sides of each ball retaining pocket and are successively longitudinally aligned along the length thereof having the ball retaining pocket adjacent which the strips are welded together prior to and during the welding of the strips together by the welding wheels 110 and 112. Said another way, the notches 48 defining the alignment means are formed in the strips in predetermined longitudinal relationship to the pocket portions 40 and 42 therein and the strips are longitudinally aligned by the tapered pins 114 as the tapered pins 114 align the notches of the respective strips adjacent each ball retaining pocket or each time the strips are welded together. The tapered members or pins 114 are moved transversely of the strips 34 and 36 and into engagement with the strips in the areas or notches 48 where the pieces have been severed therefrom.

It will be understood that the various stations or components of the apparatus may be further separated from one another or further combined. Further, the notches 48 may be formed longitudinally ahead of the holes 102 instead of behind as shown. The successive aligning of the notches 48 adjacent each pocket includes the alignment of notches 48 longitudinally spaced from the pocket portions being welded by other notches 48, i.e., it need not be the very next adjacent notch to the pocket being welded.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly of the type for transmitting motion in a curved path by a flexible motion transmitting core element and comprising: a conduit, a motion transmitting core element disposed within said conduit for longitudinal movement therein; a plurality of roller elements disposed within said conduit and engaging said core element for facilitating longitudinal movement of said core element relative to said conduit; and at least one retainer means interconnecting a plurality of said roller elements and including first and second coextensive abutting ribbon-like strips secured together and defining pocket portions in each strip which coact to define a pocket therebetween for each of said roller elements whereby one of said roller elements is rotatably retained in each of said retaining pockets, said strips being longitudinally flexible and including alignment means formed therein at longitudinally spaced positions along the strips.

2. An assembly as set forth in claim 1 wherein each alignment means in said strips is disposed in a fixed predetermined relationship to an adjacent retaining pocket.

3. An assembly as set forth in claim 2 including at least one alignment means in said fixed predetermined relationship to each of said retaining pockets.

4. An assembly as set forth in claim 3 wherein each of said alignment means comprises a pair of aligned and coextensive notches in said strips.

5. An assembly as set forth in claim 4 wherein said aligned notches are disposed in the edges of said strips.

6. An assembly as set forth in claim 5 wherein each pair of said aligned notches are transversely aligned with a like pair of said aligned notches on the opposite edge of said strips.

7. Assembly as set forth in claim 6 wherein said notches are spaced longitudinally along said strips midway between juxtaposed retaining pockets therein.

8. An assembly as set forth in claim 7 wherein said pocket portion is defined by a circular opening and an inwardly angled truncated conical flange surrounding said opening and aligned with a similar opening and flange on the opposing strip to define each of said retaining pockets, each of said openings having a diameter slightly larger than the diameter of said roller elements and said flange defining another opening having a diameter smaller than that of said roller elements.

* * * * *